US008555267B2

(12) United States Patent
Makarov

(10) Patent No.: US 8,555,267 B2
(45) Date of Patent: Oct. 8, 2013

(54) PERFORMING REGISTER ALLOCATION OF PROGRAM VARIABLES BASED ON PRIORITY SPILLS AND ASSIGNMENTS

(75) Inventor: Vladimir Makarov, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 757 days.

(21) Appl. No.: 12/717,042

(22) Filed: Mar. 3, 2010

(65) Prior Publication Data

US 2011/0219364 A1 Sep. 8, 2011

(51) Int. Cl.
*G06F 9/45* (2006.01)

(52) U.S. Cl.
USPC ........... 717/151; 717/152; 717/153; 717/154; 717/155; 717/156; 717/157; 717/158; 717/159; 717/160; 717/161

(58) Field of Classification Search
None
See application file for complete search history.

(56) References Cited

U.S. PATENT DOCUMENTS

| 4,571,678 | A | * | 2/1986 | Chaitin | 717/156 |
| 5,367,696 | A | * | 11/1994 | Abe | 717/153 |
| 5,428,793 | A | * | 6/1995 | Odnert et al. | 717/157 |
| 5,530,866 | A | * | 6/1996 | Koblenz et al. | 717/144 |
| 5,555,417 | A | * | 9/1996 | Odnert et al. | 717/159 |
| 5,761,514 | A | * | 6/1998 | Aizikowitz et al. | 717/158 |
| 5,774,730 | A | * | 6/1998 | Aizikowitz et al. | 717/157 |
| 5,790,862 | A | * | 8/1998 | Tanaka et al. | 717/159 |
| 5,946,492 | A | * | 8/1999 | Bates | 717/156 |
| 6,135,650 | A | * | 10/2000 | Goebel | 717/143 |
| 7,155,707 | B2 | * | 12/2006 | Clarke | 717/144 |
| 7,185,329 | B1 | * | 2/2007 | Verbitsky | 717/156 |
| 7,207,032 | B1 | * | 4/2007 | Verbitsky | 717/106 |
| 7,278,137 | B1 | * | 10/2007 | Fuhler et al. | 717/153 |
| 8,104,026 | B2 | * | 1/2012 | Koseki et al. | 717/140 |
| 8,141,062 | B2 | * | 3/2012 | Baev et al. | 717/152 |
| 8,266,603 | B2 | * | 9/2012 | Inagaki et al. | 717/140 |
| 2008/0184215 | A1 | * | 7/2008 | Baev et al. | 717/155 |
| 2011/0161945 | A1 | * | 6/2011 | Kalogeropulos et al. | 717/152 |

OTHER PUBLICATIONS ("The Priority-Based Coloring Approach to Register Allocation" ACM Transactions on Programming Languages and Systems. vol. 12. No. 4. Oct. 1990, pp. 501-536.*
"Register Allocation via Graph Coloring" A thesis by Preston Briggs, Rice University, Apr. 1992.*
"A Model-based Framework: an Approach for Profit-driven Optimization" by Zhao et al. ACM SIGMICRO Symposium on Code Generation and Optimization, Mar. 2005.*

(Continued)

*Primary Examiner* — Henry Tsai
*Assistant Examiner* — Jing-Yih Shyu
(74) *Attorney, Agent, or Firm* — Lowenstein Sandler LLP

(57) ABSTRACT

A mechanism for performing register allocation based on priority spills and assignments is disclosed. A method of embodiments of the invention includes repetitively detecting fat points during a compilation process of a software program running on a virtual machine of a computer system, each fat point representing a program point having a high register pressure, the high register pressure occurs when a number of live program variables of the software program living at a given program point of the software program is greater than a number of available processor registers of the computer system. The method further includes choosing a fat point with a highest register pressure, selecting a live program variable having a lowest priority at the chosen fat point, and spilling the lowest priority live program variable to memory of the computer system.

20 Claims, 4 Drawing Sheets

(56) References Cited

OTHER PUBLICATIONS

"Effectiveness of a Machine-Level, Global Optimizer" by Mark Scott Johnson and Terrence C. Miller, 1986 AeM .0-S 9191-191-0/86/0600-0099.*

"Improvements to Graph (oloring Register Allocation" by Briggs et al. Rice University, ACM Transactions on Programming Languages and Systems, vol. 16, No. 3, May 1994, pp. 428-455.*

"Optimization for the Intel® Itanium® Architecture Register Stack" by Settle et al.*

"Region-Based Compilation" by Richard Eugene Hank, Thesis at University of Illinois at Urbana-Champaign, 1996.*

"Register Pressure Sensitive Redundancy Elimination" by Rajiv Gupta and Rastislav Bodik at Univ. of Pittsburgh.*

Briggs et al. "Rematerialization" Proceedings of the ACM SIGPLAN 1992 conference on Programming Language Design and Implementation, 1992.*

Baev et al. "Prematerialization: reducing register pressure for free", Proceedings fo the 15th international conference on Parallel architectures and compilation techniques, 2006.*

Lo et al. "Aggregate Operation Movement: A Min-Cut Approach to Global Code motion", Proceedings of the Second International Euro-Par Conference on Parallel Processing—vol. II, 1996.*

* cited by examiner

PERFORMING REGISTER ALLOCATION OF PROGRAM VARIABLES BASED ON PRIORITY SPILLS AND ASSIGNMENTS

TECHNICAL FIELD

The embodiments of the invention relate generally to compiler optimization and, more specifically, relate to a mechanism for performing register allocation based on priority spills and assignments.

BACKGROUND

In compiler optimization, register allocation is a well-known process of mapping program variables (also referred to as "pseudos") with central processing unit (CPU) or processor registers. The number of processor registers on a processor is considered constraint since that number depends on the architectural design of the processor, and regardless of how large the number of processor registers, it is still considered a smaller number compared to the large (and unconstraint) number of program variables a typical software programs has to process. This discrepancy of not having enough processor registers to hold program variables is known as "high register pressure", which leads to what is typically referred to as "spilling" or "register spilling".

Spilling occurs when there are more live program variables than the available processor registers to hold them and thus, a compiler is forced to spill some of the program variables to memory, which leads to inefficiency because accessing memory is typically slower than accessing processor registers. Register allocation can be local (e.g., restricted to a small section of a procedure or a basic block), global (e.g., performed on the whole procedure), or interprocedural (e.g., performed in-between or across multiple procedures). A number of conventional solutions exist to manage register allocation and memory spilling, but none of the existing solution is without its shortcomings.

One well-known solution is register allocation by graph coloring ("GC"). However, this solution does not provide for proper selection of program variables for spilling (to memory) which leads to high allocation time and inefficiency in register allocation. Another solution is extended linear scan ("ELS"). Although this solution is considered an improvement for spilling over GC, but only a small improvement. When considering a spill, ELS is static in its analysis of whether to spill a program variable to memory and further, it is limited to the program variable at hand and does not give consideration to other program variables or their relationship with the variable that is to be spilled.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
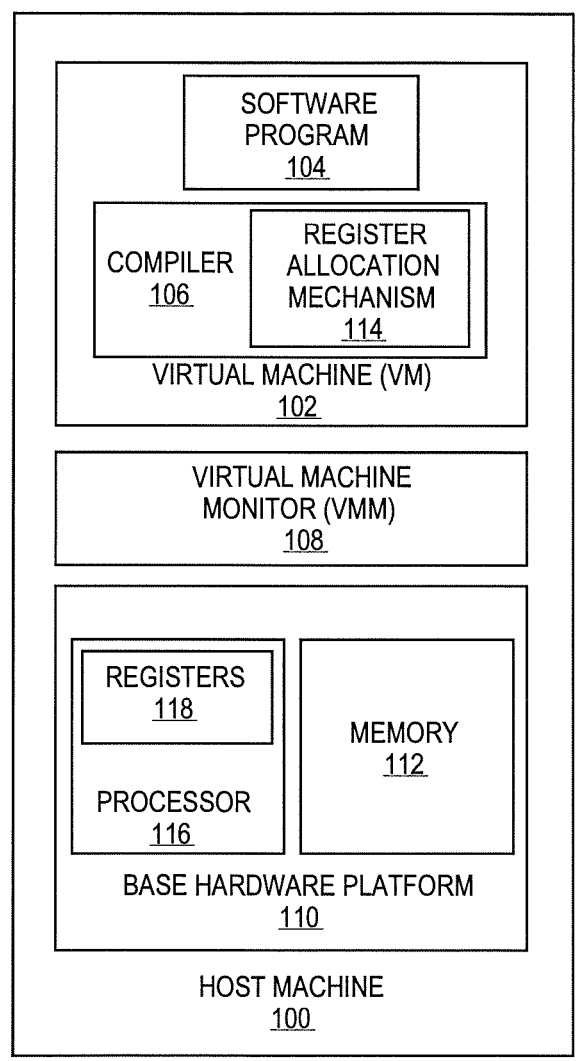
FIG. 1 is a block diagram of a host machine for employing an embodiment of a register allocation mechanism to perform register allocation based on priority spills and assignments according to one embodiment of the invention.

Embodiments of the invention provide for performing register allocation based on priority spills and assignments. A method of embodiments of the invention includes repetitively detecting fat points during a compilation process of a software program running on a virtual machine of a computer system, each fat point representing a program point having a high register pressure, the high register pressure occurs when a number of live program variables of the software program living at a given program point of the software program is greater than a number of available processor registers of the computer system. The method further includes choosing a fat point with a highest register pressure, selecting a live program variable having a lowest priority at the chosen fat point, and spilling the lowest priority live program variable to memory of the computer system.

Embodiments of this invention improve the process of register allocation to provide an efficient compiler optimization and an improved generated code performance. Given the importance of register allocation in compilation, efficient compiler optimization and improved generated code performance can result in a large saving of system resources. For example, a 1% improvement in generated code performance translates into a saving of 1% computer power consumption for the computer system where the generated code is executed.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting", "choosing", "selecting", "assigning", "spilling", "unspilling", "removing", "undoing", "calculating", "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, read-only memories (ROMs), compact disk ROMs (CD-ROMs), random access memories (RAMs), erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

FIG. 1 is a block diagram of a host machine 100 for employing an embodiment of a register allocation mechanism 114 to perform register allocation based on priority spills and assignments according to one embodiment of the invention. Host machine 100 includes a base hardware platform 110 that comprises a computing platform, which may be capable, for example, of executing a standard operating system ("OS") or a virtual machine monitor ("VMM") 108. In some embodiments, base hardware platform 110 may include a processor 116, memory devices 112, network devices, drivers, and so on. VMM 108 virtualizes these physical resources of the base hardware platform 110 of host machine 100 for one or more VMs 102. Embodiments of the invention encompass host machine 100 being capable of hosting many VMs simultaneously, but only one VM 102 is shown here for purposes of brevity, clarity, and ease of explanation. VM 102 hosts a software program 104.

VM 102 further hosts a compiler 106 to transform the source code of software program 104 from a high-level programming language or source language (e.g., C, C++, etc.) to a lower level language or object code (e.g., machine code, assembly language, etc.) such that the software program 104 can become an executable program. Base hardware platform 110 hosts processor 116 that includes processor registers 118.

Compiler 106 includes a software tool for transforming software program 104 written with a high-level programming language into a low level machine code (also referred to as "generated code") understandable by a computer system. Compiler optimizing is aimed at making such transformation as efficient as possible, while register allocation is regarded an important process for improving compiler performance and optimization. Intermediate representation refers to an internal compiler representation or level on which the transformation from a programming language into a machine language is performed. At this level, the software program 104 to be transformed from the programming language into the machine language may be regarded as an intermediate code.

In one embodiment, as illustrated, compiler 106 hosts a register allocation mechanism 114 to perform register allocation based on priority spills and assignments of program variables or pseudos living ("living program variables" or "living pseudos") on high register pressure program points being created on the fly. Register allocation refers to a process for mapping and sending (an unconstrained number of) living pseudos to (a constrained number of) processor (or machine) registers 118 (e.g., a pseudo is said to be "assigned" to a processor register 118); or, sending the living pseudos to memory 112 (e.g., a pseudo is said to be "spilled" to memory 112).

Typically, each register 118 holds a single value at any given "program point". A program point refers to any point reached by a software program 104 during its program transformation (e.g., a point in the intermediate code). A pseudo is regarded as holding a value during compiler optimization and is said to be live at a program point if it holds a value that can be used now or later during compilation. At any given program point, when the number of live pseudos ready to be assigned to a processor registers 118 is greater than the number of processor registers 118 available to hold live pseudos, the discrepancy known as high register pressure is reached. In this case, the remaining pseudos are spilled to memory 112.

In one embodiment, register allocation mechanism 114 begins the process of register allocation by performing an initial calculation of high register pressure program points of the software program 104. A high register pressure program point is that point in the processing or compilation of the software program 104 where the register pressure is bigger than a number of available processor registers of the processor registers 118 of the host machine 100. Such program points are referred to as "fat points" throughout this document. These fat points may be repetitively detected and the register allocation mechanism 114 determines the most expensive fat point, i.e., the fat point with the highest register pressure, and any pseudos at that fat point are regarded as high priority pseudos. Further, the register allocation mechanism 114 begins to determine "pseudo priority" and the relevant "pseudo cost" of each pseudo, particularly of those living at fat points.

Pseudo priority refers to the general importance and use of a pseudo within the software program 104 and its impact during the compilation process, which helps determine the pseudo's influence or impact on the overall registration allocation process. For example, a pseudo that repeats more often than any other pseudo in the software program 104 would be regarded as having a greater role during the compilation of the software program 104 and thus, a greater impact on the register allocation process. More specifically, since it is more efficient to recall an assigned pseudo from a processor register 118 than a spilled pseudo from a memory 112, register assignment priority is granted to a more frequently repeating pseudo than to a pseudo that does not repeat as frequently. This pseudo priority is calculated and compared for each pseudo of the software program 104.

Pseudo cost refers to the difference between the cost of having a pseudo spilled to memory 112 and the cost of having it assigned to a processor register 118. In addition to calculating the pseudo cost for each pseudo, the register allocation mechanism 114 also takes into consideration the "total pseudo cost" which refers to the sum of pseudo costs associated with the corresponding pseudos livings at one or more program points to determine an overall impact on register allocation of each pseudo at a number of program points.

In one embodiment, the resister allocation mechanism 114 seeks a pseudo (for spilling or assignment) based on its corresponding fat point's cost (e.g., how high is the register pressure at that fat point) and characteristics as well as the pseudo priority associated with the pseudo (e.g., considering the pseudo's own pseudo cost as well as the total pseudo cost for determining its relationship to other pseudos and its potential overall impact on the processes of register allocation and compiler optimization).

In one embodiment, pseudo priority is calculated based on pseudo cost, total pseudo cost, and other pseudo characteristics and fat point characteristics. Some of the pseudo characteristics of a pseudo include pseudo cost, pseudo lifespan, pseudo repetitiveness or frequency at which the pseudo appears (or reappears) in software program 104, a number of pseudo references in program instructions, a number of available processor registers to hold the pseudo, etc. A fat point characteristic includes an accumulated frequency of the detected fat points through which a pseudo (that is to be spilled or assigned) lives compared to other detected fat points. Based on these determinations, a pseudo is selected over other pseudos and then, it is either spilled to memory 112 or assigned to a processor register 118 and the fat points are updated accordingly. The process continues in the similar manner.

Pseudo priority may include "spill priority" and "assign priority". In one embodiment, the following formula provides a spill (or assign) priority calculation for a pseudo: Priority=Pseudo_Cost*log2 (Pseudo_References_Number)/Fat_Point_Frequency. Here, Fat_Point_Frequency refers to a summary of execution frequencies of (or cost associated with) all those fat points through which a given pseudo lives. In this case of priority definition, in one embodiment, a living pseudo is correspondingly chosen to be spilled to the memory 112 or assigned to a processor register 118. In one embodiment, a pseudo with a lowest (assign) priority is spilled to memory 112.

At a given program point, if no fat points are detected, the already spilled pseudos are chosen to be sorted according to their "assign priority". Assign priority refers to the priority associated with pseudos based on which each pseudo is to be assigned to a processor register 118, while spill priority refers to the priority assigned to pseudo based on which each pseudo is to be spilled to memory 112. In many cases, an assign priority and a spill priority for a given pseudo are inversely proportional to each other, i.e., a high assign priority (e.g., a pseudo should be assigned to a processor register 118) could mean a low spill priority for that pseudo (e.g., that pseudo should not be spilled to memory 112) and vice versa. Of the already spilled pseudos, the pseudos with high assign priority are processed first and, if their unspilling does not create new fat points, their spill is undone as they are removed from memory 112 and assigned to a corresponding number of available processor registers of processor registers 118. In some cases, an unspilled pseudo may be brought back into a particular stage of the transformation code during compilation. An assign priority could be the same as a spill priority (with Fat_Point_Frequency being equal to 1 if a given pseudo does not live through any fat points) or different than spill priority (such as Priority=Pseudo_Cost*log2 (Pseudo_References_Number)).

In one embodiment, non-spilled and unassigned pseudos are sorted according their assign priority. The pseudo with the highest assign priority is processed first and is assigned to a processor register 118. The register allocation process is considered complete when there are no more non-spilled and unassigned pseudos at any of the program points; otherwise, new fat points are created and the register allocation process continues with the newly determined fat points (in the same manner as described above).

In one embodiment, fat points are repetitively or repeatedly detected during compilation the software program 104 running on the virtual machine 102 of the host machine 100. Each fat point represents a program point having a high register pressure, while the high register pressure represents a number of live program variables (or live pseudos) of the software program at a given program point being greater than a number of available processor registers of the processor registers 118 at the processor 116. In one embodiment, fat points are repetitively or repeatedly detected and a fat point with a highest register pressure is chosen. Then, a live program variable having a lowest priority at the chosen fat point is selected, and this lowest priority live program variable is spilled to memory 112. This lowest priority associated with the live program variable refers to the lowest assign priority (or the highest spill priority). Further, a live program variable having a highest priority is selected and then assigned to a processor register 118 when there are no fat points. This highest priority associated with the live program variable refers to the highest assign priority (or the lowest spill priority). Any non-spilled or unassigned live program variables are sorted based on their assign priority (e.g., in a descending order of their assign priority) and are, accordingly, assigned to the program registers 118 (e.g., starting with the live program variable having the highest assign priority and going down the list in a descending order).

Figure 2:
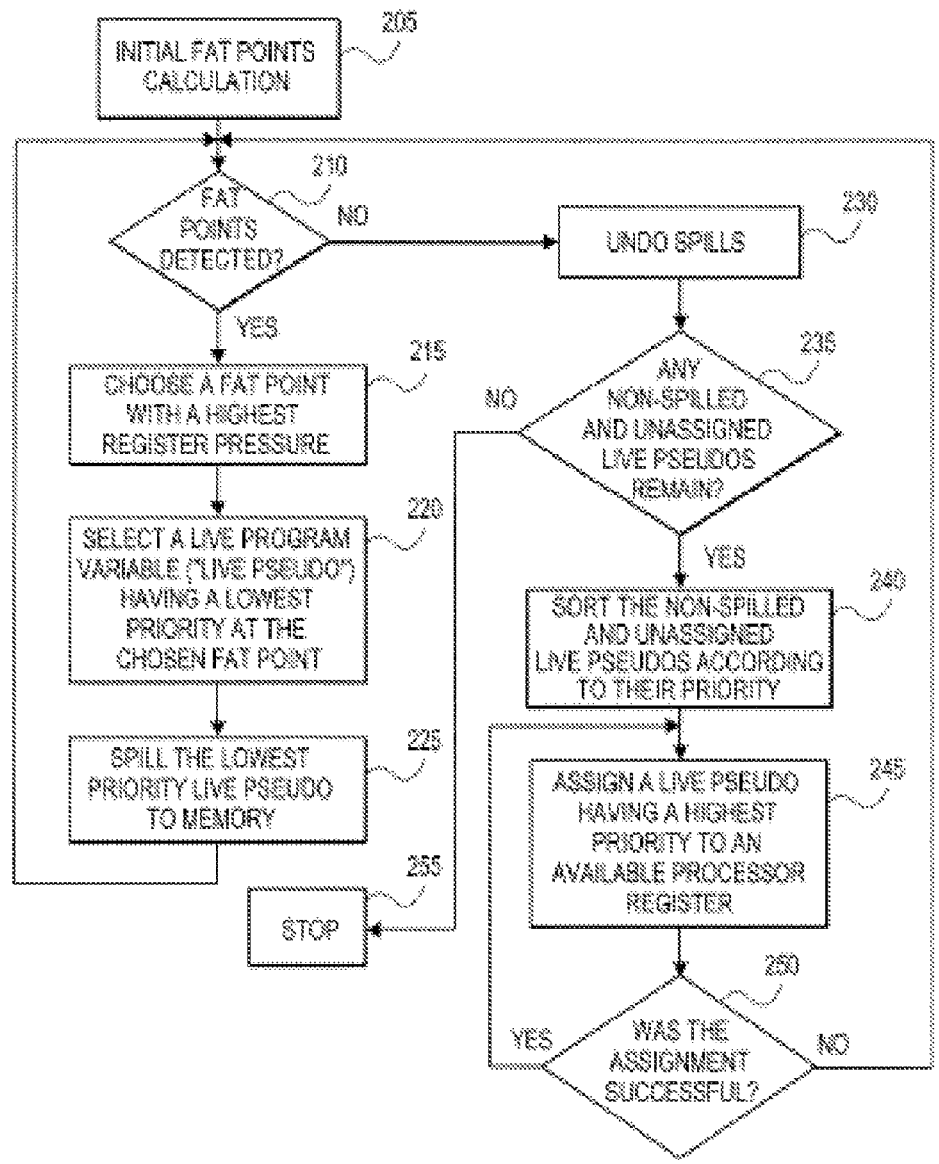
FIG. 2 is a flow diagram illustrating a method for performing register allocation based on priority spills and assignments according to one embodiment of the invention.

FIG. 2 is a flow diagram illustrating a method 200 for performing register allocation based on priority spills and assignments according to one embodiment of the invention. Method 200 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 200 is performed by register allocation mechanism of FIG. 1.

Method 200 begins at block 205 where register allocation mechanism performs an initial determination and calculation of fat points of software program running on a virtual machine of a computer system. At block 210, a determination is made as to whether any fat points are detected or remain. If any fat points are detected, at block 215, as aforementioned with regard to FIG. 1, a fat point with a highest register pressure is chosen. In one embodiment, fat points are repetitively or repeatedly detected and a particular fat point with the highest pressure is chosen. This repetitive detection of the fat points may be performed at any given rate or frequency based on, but not limited to, various attributes of register allocation (e.g., high register pressures) and of the overall compilation process as discussed throughout this document. At block 220, a live pseudo (or live program variable) having a lowest priority (e.g., minimal/lowest assign priority and/or maximal/highest spill priority) at the chosen fat point is selected for spilling to memory of the computer system. The selected lowest (assign) priority pseudo is then spilled to memory, at block 225, and the process continues with detection of additional fat points at block 210.

Referring back to block 210, if no fat points are detected, at block 230, the already spilled live pseudos are unspilled for further processing. At block 235, a determination is made as to whether any non-spilled or unassigned live pseudos remain. If there are no non-spilled or unassigned live pseudos, the register allocation process ends at block 255. If, however, there remain non-spilled or unassigned live pseudos, they are sorted according to their priority at block 240. In one embodiment, sorting begins with a non-spilled/unassigned live pseudo having the highest (assign) priority and proceeding on with other live pseudos in a descending order of their assign priority until the live pseudos are sorted. these live pseudos are unspilled and assigned to processor (or machine) registers of a processor of the computer system.

Once the non-spilled/unassigned live pseudos are sorted, at block 245, the sorted live pseudos are assigned to processor registers in the same order (e.g., descending order), such as starting with a live pseudo having the highest/maximal (assign) priority (e.g., equaling lowest/minimal spill priority) is selected and then assigned to an available processor register and the processes continues. If the assignment is successful (e.g., no new or additional fat points are created), as determined at block 250, the process of assigning these live pseudos to available processor registers continues in the same order of assignment at block 245. If, however, the assignment process is determined to be unsuccessful at block 250, the registration allocation process returns to detecting whether there are any more fat points at block 210 and the process continues thereafter.

Figure 3:
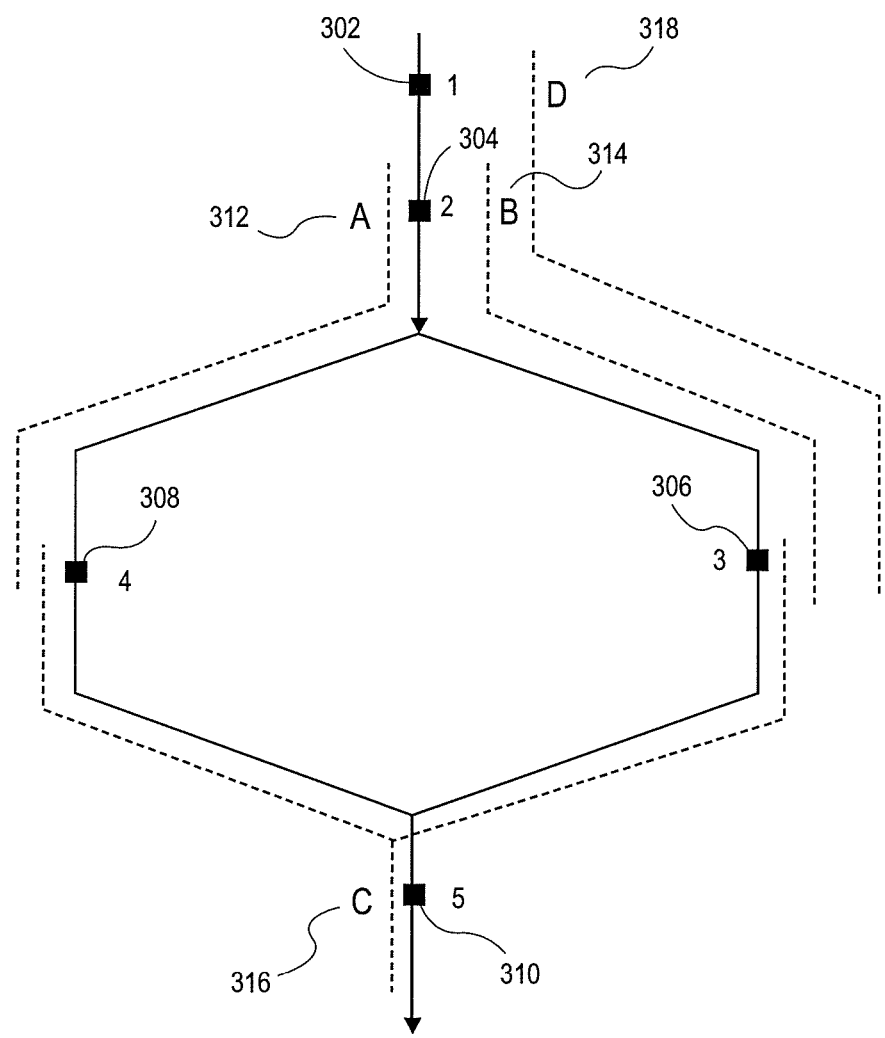
FIG. 3 is a control flow diagram illustrating a mechanism for performing register allocation based on priority spills and assignments according to one embodiment of the invention.

FIG. 3 is a control flow diagram illustrating a mechanism for performing register allocation based on priority spills and assignments according to one embodiment of the invention. In the illustrated embodiment, there are five program points shown as point 1 302, point 2 304, point 3 306, point 4 308 and point 5 310 and four pseudos shown as pseudo A 312, pseudo B 314, pseudo C 316 and pseudo D 318. Let us suppose each of program point 1 302, point 2 304 and point 5 310 has an execution frequency of 10, while point 4 308 has an execution frequency of 7 and point 3 306 has an execution frequency of 3. Similarly, let us suppose pseudo A 312, pseudo B 314, pseudo C 316, and pseudo D 318 have pseudo costs of 17, 13, 20, and 23, respectively. Continuing with this example, let us suppose now that each of pseudos A 312 and B 314 is referenced two times in code instructions of a software program running at a virtual machine of a computer system, while each of pseudos C 316 and D 318 is referenced 3 times. Finally, let us assume there are two processor registers at a processor of the computer system.

First, at stage 1, register allocation mechanism (as described with respect to FIG. 1) detects and regards point 2 304 and point 3 306 as fat points. At stage 2, register allocation mechanism selects fat point 3 306 because of its higher pseudo cost equaling 56 (i.e., 13+20+23 of pseudo B 314+pseudo C 316+pseudo D 318, respectively) because pseudo B 314, pseudo C 316 and pseudo D 318 live through fat point 3 306. This pseudo cost of 63 is higher than the pseudo cost of 53 of point 2 304 (i.e., 17+13+23 of pseudo A 312+pseudo B 314+pseudo D 318, respectively). At stage 3, register allocation mechanism chooses pseudo B 314 as having the smallest assign priority level equaling the result of $(13*\log2(2)/13)$(as compared to the results of $(20*\log2(3)/3)$ for pseudo C 316, and the result of $(23*\log2(3)/13)$ of pseudo D 318). Thus, in this illustration, pseudo B 314 with a lowest/minimal assign priority (may be representing a highest/maximal spill priority) is spilled to memory and no more fat points remain.

At stage 4, undoing the spill of pseudo B 314 is attempted and fails, so pseudo B 314 remains spilled at memory. At stage 5, register allocation mechanism assigns a first processor register to pseudo D 318 as having a highest/maximal assign priority (may be representing a lowest/minimal spill priority) of $23*\log2(3)$ compared to those of pseudo C 316 and pseudo D 318. Then, a second processor register is assigned to pseudo C 316 for having the second highest assign priority of $20*\log2(3)$. Since there are only two processor registers, no register is assigned to pseudo A 312 (as no available registers remain), while pseudo B 314 remains spilled. This means, pseudo A 312 is the only non-spilled and unassigned pseudo.

At this state, there are two fat points, i.e., point 2 304 and point 4 308, through which non-spilled and unassigned pseudo A lives with no available processor registers remaining. Next, when point 2 304 is chosen as the fat point, pseudo A 312 is chosen to be spilled (to memory) since there are no more available processor registers. The undoing of the spilling of pseudo A 312 is attempted and fails and the process of register allocation is completed with pseudos C 316 and D 318 being assigned to processor registers, and pseudos A 312 and B 314 being spilled to memory.

In one embodiment, using register allocation mechanism, fat points are created on the fly after each register assignment failure, pseudo spilling on fat points is chosen based on a particular fat point cost (e.g., how high is the register pressure), and a pseudo is chosen to be spilled or assigned based on its pseudo cost and priority (e.g., assign priority, spill priority), its number of references in instructions, and characteristics of the fat points through which the pseudo lives.

Figure 4:
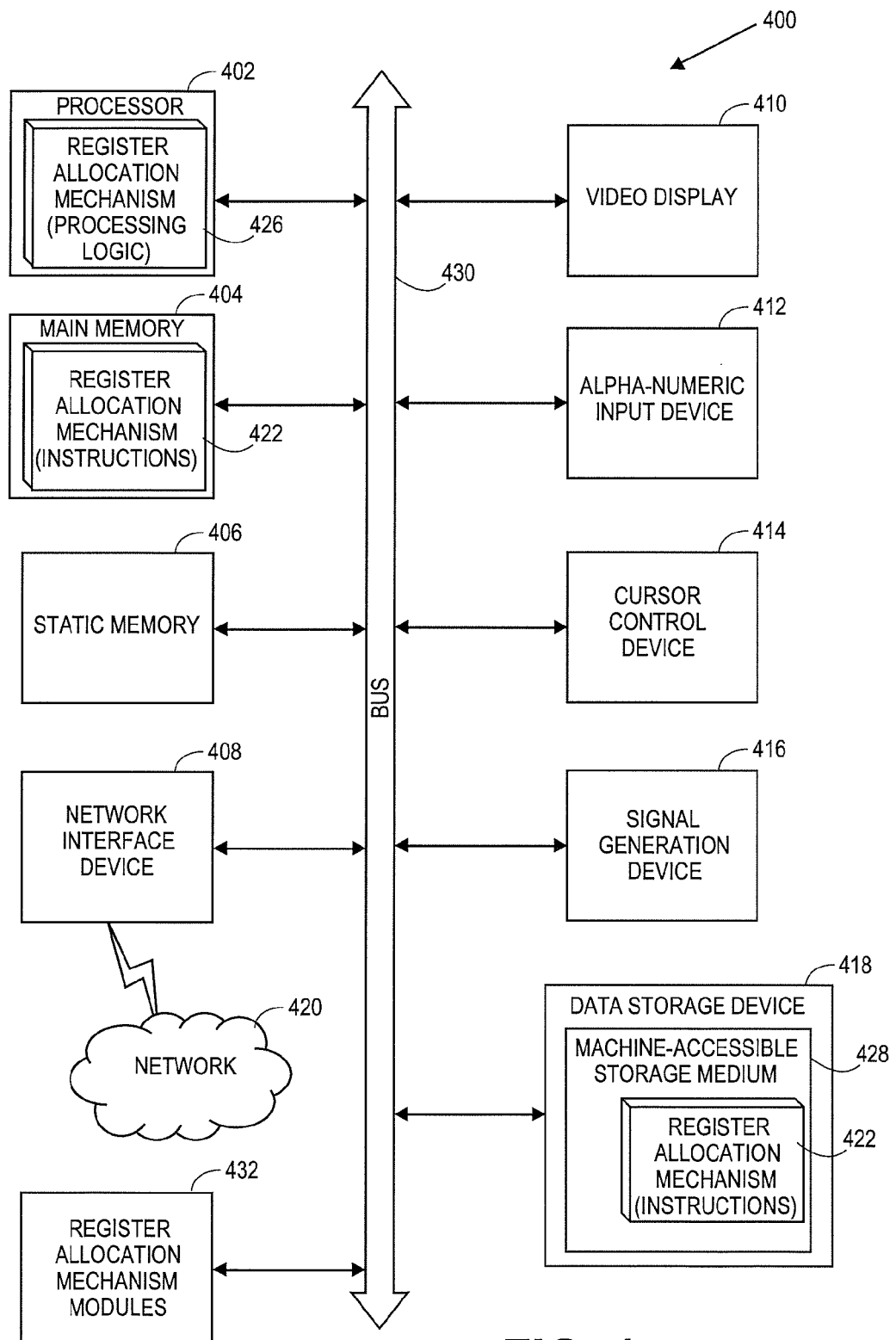
FIG. 4 is a block diagram of a computer system for performing register allocation based on priority spills and assignments according to one embodiment of the invention.

FIG. 4 is a block diagram of a computer system 400 for performing register allocation based on priority spills and assignments according to one embodiment of the invention. Within the computer system 400 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., ROM, flash memory, dynamic random access memory (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computer system 400 may further include a network interface device 408. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., register allocation mechanism) embodying any one or more of the methodologies or functions described herein. The register allocation mechanism may also reside, completely or at least partially, within the main memory 404 (e.g., register allocation mechanism (instructions) 422) and/or within the processing device 402 (e.g., register allocation mechanism (processing logic) 426) during execution thereof by the computer system 400, the main memory 404 and the processing device 402 also constituting machine-readable storage media. Further, for example, the register allocation mechanism instructions 422 may be transmitted or received over a network 420 via the network interface device 408.

The machine-readable storage medium 428 may also be used to store the register allocation mechanism (instructions) 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Register allocation mechanism modules 432, components and other features described herein (for example in relation to FIG. 1) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
    detecting fat points during a compilation process of a software program running on a virtual machine of a computer system, each detected fat point representing a program point having a high register pressure, the high register pressure to occur when a number of live program variables of the software program existing at a given program point of the software program is greater than a number of available processor registers of the computer system, wherein a live program variable comprises a program variable that maintains a value that can be used at least one of currently or later during compilation;
    choosing the fat point with a highest register pressure;
    within the chosen fat point, selecting the live program variable having a lowest priority, wherein the lowest priority is determined in view of a live program variable cost comprising a difference between a cost of assigning the live programing variable to a processor register and a cost of sending the live program variable to memory of the computer system and in view of a sum of live program variable costs of each of other live program variables at the chosen fat point; and
    sending the lowest priority live program variable to the memory of the computer system.

2. The computer-implemented method of claim 1, further comprising:
    selecting the live program variable having a highest priority at the chosen fat point; and
    assigning the selected live program variable having the highest priority to one of the available processor registers.

3. The computer-implemented method of claim 2, wherein the highest priority comprises a highest assign priority or a lowest spill priority.

4. The computer-implemented method of claim 1, further comprising unspilling already-spilled live program variables from the memory when no fat points are detected in the compilation process.

5. The computer-implemented method of claim 4, further comprising removing the unspilled live program variables from the memory, and assigning unspilled live program variables to available processor registers.

6. The computer-implemented method of claim 5, wherein removing and assigning are performed according to an assign priority associated with each unspilled live program variable.

7. The computer-implemented method of claim 1, wherein the lowest priority comprises a lowest assign priority or a highest spill priority.

8. A system comprising:
    a processor communicably coupled to a memory; and
    a virtual machine being executed by the processor from the memory, the virtual machine to run a software program, the virtual machine comprising a register allocation component to:
        detect fat points during a compilation process of the software program, each detected fat point representing a program point having a high register pressure, the high register pressure to occur when a number of live program variables of the software program existing at a given program point of the software program is greater than a number of available processor registers of the computer system, wherein a live program variable comprises a program variable that maintains a value that can be used at least one of currently or later during compilation;

choose the fat point with a highest register pressure;

within the chosen fat point, select the live program variable having a lowest priority, wherein the lowest priority is determined in view of a live program variable cost comprising a difference between a cost of assigning the live programing variable to a processor register and a cost of sending the live program variable to memory of the computer system and in view of a sum of live program variable costs of each of other live program variables at the chosen fat point; and send the lowest priority live program variable to the memory.

9. The system of claim 8, wherein the register allocation component is further to:

select the live program variable having a highest priority at the chosen fat point; and assign the selected live program variable having the highest priority to one of the available processor registers.

10. The system of claim 8, wherein the highest priority comprises a highest assign priority or a lowest spill priority.

11. The system of claim 8, wherein the virtual machine further having a compiler to execute the compilation process of the software program, the compiler comprising the register allocation component.

12. The system of claim 8, wherein the register allocation component is further to unspill already-spilled live program variables from the memory when no fat points are detected in the compilation process.

13. The system of claim 12, wherein the register allocation component is further to remove the unspilled live program variables from the memory, and assign unspilled live program variables to available processor registers.

14. The system of claim 13, wherein the removing and assigning are performed according to an assign priority associated with each unspilled live program variable.

15. A non-transitory machine-readable storage medium having instructions that, when executed by a processing device, cause the processing device to perform operations comprising:

detecting fat points during a compilation process of a software program running on a virtual machine (VM) of a computer system comprising the processing device, each detected fat point representing a program point having a high register pressure, the high register pressure to occur when a number of live program variables of the software program existing at a given program point of the software program is greater than a number of available processor registers of the computer system, wherein a live program variable comprises a program variable that maintains a value that can be used at least one of currently or later during compilation;

choosing the fat point with a highest register pressure;

within the chosen fat point, selecting the live program variable having a lowest priority, wherein the lowest priority in view of a live program variable cost comprising a difference between a cost of assigning the live programing variable to a processor register and a cost of sending the live program variable to memory of the computer system and in view of a sum of live program variable costs of each of other live program variables at the chosen fat point; and sending the lowest priority live program variable to the memory of the computer system.

16. The non-transitory machine-readable storage medium of claim 15, having further instructions that, when executed, cause the processing device to perform further operations comprising:

selecting the live program variable having a highest priority at the chosen fat point; and assigning the selected live program variable having the highest priority to one of the available processor registers.

17. The non-transitory machine-readable storage medium of claim 15, wherein the highest priority comprises a highest assign priority or a lowest spill priority.

18. The non-transitory machine-readable storage medium of claim 15, having further instructions that, when executed, cause the processing device to perform further operations comprising:

unspill already-spilled live program variables from the memory according if no fat points are detected in the compilation process;

remove the unspilled live program variables from the memory; and assign the unspilled live program variables to available processor registers.

19. The non-transitory machine-readable storage medium of claim 15, wherein the lowest priority comprises a lowest assign priority or a highest spill priority.

20. The non-transitory machine-readable storage medium of claim 18, wherein the removing and assigning are performed according to an assign priority associated with each unspilled active live program variable.

* * * * *